US012451312B2

(12) United States Patent
Hoffmann et al.

(10) Patent No.: US 12,451,312 B2
(45) Date of Patent: Oct. 21, 2025

(54) SWITCHING DEVICE WITH AT LEAST ONE MOVABLE CONTACT, AT LEAST ONE AUXILIARY CONTACT, AT LEAST ONE SPRING CONTACT AND A CONTACT PLATE

(71) Applicant: TDK Electronics AG, Munich (DE)

(72) Inventors: Robert Hoffmann, Berlin (DE); Robert Minkwitz, Berlin (DE)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/996,197

(22) PCT Filed: May 11, 2021

(86) PCT No.: PCT/EP2021/062471
§ 371 (c)(1),
(2) Date: Oct. 13, 2022

(87) PCT Pub. No.: WO2021/239460
PCT Pub. Date: Dec. 2, 2021

(65) Prior Publication Data

US 2023/0197388 A1 Jun. 22, 2023

(30) Foreign Application Priority Data

May 28, 2020 (DE) ..................... 10 2020 114 385.0

(51) Int. Cl.
*H01H 50/54* (2006.01)
*H01H 50/02* (2006.01)

(52) U.S. Cl.
CPC ........ *H01H 50/546* (2013.01); *H01H 50/023* (2013.01); *H01H 50/541* (2013.01); *H01H 2050/025* (2013.01)

(58) Field of Classification Search
None
See application file for complete search history.

(56) References Cited

U.S. PATENT DOCUMENTS 10,102,991 B2 * 10/2018 Kanematsu .............. H01H 9/34
2006/0091985 A1 * 5/2006 Mochizuki ............ H01H 50/54 335/128
2018/0144893 A1 5/2018 Konishi et al.
(Continued)

FOREIGN PATENT DOCUMENTS

DE 288870 C 12/1914
DE 1894372 U 6/1964
(Continued)

*Primary Examiner* — Bernard Rojas
(74) *Attorney, Agent, or Firm* — Slater Matsil, LLP

(57) ABSTRACT

In an embodiment a switching device includes at least two fixed contacts and one movable contact in a switching chamber and at least two auxiliary contacts, two spring contacts and a contact plate in the switching chamber, wherein each of the spring contacts contacts one of the auxiliary contacts with a first contact region and has a second contact region, wherein the contact plate is movable together with the movable contact, and wherein the contact plate is configured to contact the second contact regions of the spring contacts in a first switching state of the switching device and is configured to be arranged at a distance from the second contact regions of the spring contacts in a second switching state.

20 Claims, 5 Drawing Sheets

(56) References Cited

U.S. PATENT DOCUMENTS

| | | | | |
|---|---|---|---|---|
| 2018/0144894 | A1* | 5/2018 | Takaya | H01H 50/14 |
| 2018/0269017 | A1* | 9/2018 | Konishi | H01H 50/20 |
| 2021/0202197 | A1* | 7/2021 | Werner | H01H 33/08 |

FOREIGN PATENT DOCUMENTS

| | | | |
|---|---|---|---|
| EP | 2843683 | A1 | 3/2015 |
| EP | 3410459 | A1 | 12/2018 |
| EP | 3471127 | A1 | 4/2019 |
| JP | H08203367 | A | 8/1996 |
| JP | 2017162729 | A | 9/2017 |
| JP | 2018113139 | A | 7/2018 |
| JP | 2018163761 | A | 10/2018 |
| WO | 2008033349 | A2 | 3/2008 |

* cited by examiner

SWITCHING DEVICE WITH AT LEAST ONE MOVABLE CONTACT, AT LEAST ONE AUXILIARY CONTACT, AT LEAST ONE SPRING CONTACT AND A CONTACT PLATE

This patent application is a national phase filing under section 371 of PCT/EP20021/062471, filed May 11, 2021, which claims the priority of German patent application 102020114385.0, filed May 28, 2020, each of which is incorporated herein by reference in its entirety.

TECHNICAL FIELD

A switching device is specified.

BACKGROUND

The switching device is embodied, in particular, as a remotely actuated, electromagnetically acting switch, which can be operated by an electrically conductive current. The switching device can be activated via a control circuit and can switch a load circuit. In particular, the switching device can be designed as a relay or as a contactor, in particular as a power contactor. The switching device can particularly preferably be designed as a gas-filled power contactor.

One possible application of such switching devices, in particular power contactors, is the opening and disconnection of battery circuits, for example in motor vehicles such as electrically or partially electrically operated motor vehicles or in applications in the field of renewable energies.

In its function as a safety component, a contactor, for example, is normally additionally monitored, wherein contactor monitoring is regulated in the IEC 60947-5-1 standard. Contactor monitoring is intended, for example, to detect the most common fault in contactors, relays and switches, namely sticking or welding of the main contacts. Such a fault, also known as contactor sticking, can be caused, for example, by electric arcs that form between the contacts during switching operations under load and can cause such high temperatures at the contact surfaces that the contact surfaces are welded together. Furthermore, it is advantageous when other fault conditions can be detected, for example if a contact is mechanically blocked in an open position or in an intermediate state.

Typical contactors are embodied as so-called overtravel systems. This means that after the main contacts have been interconnected by the switching bridge and thus electrically closed, the movement of the closing system is continued, wherein a usually spring-loaded pressure of the switching bridge on the main contacts increases. In the case of a contactor sticking, this overtravel is relieved, but the switching bridge remains stuck to at least one main contact. The mechanical system is thus suspended in an intermediate state and is neither open nor properly closed.

Monitoring or contactor sticking detection can be carried out, for example, by means of a voltage measurement via the main contacts of the contactor. If a voltage is present between the main contacts, it follows that the contactor is open. If no voltage is present, it follows that the contactor is short-circuited and therefore closed. Although this method is very safe, it is also expensive to use, since cables that carry high-voltage potential must be laid and insulated accordingly. Monitoring is usually performed by a higher-level system, such as an AD converter controlled by a microcontroller.

It is also known, for example, to use a microswitch in the switching chamber of the contactor, which is operated by a small cantilever on the switching bridge. The cantilever operates the switch just before the switching bridge is pressed against the main contacts. In this case, the switch can be a normally open contact (closed when pressed) or a normally closed contact (open when pressed). The signal of the microswitch can thus also be designed being inverted compared to the switching state of the contactor. A disadvantage of this solution is that the microswitch must be placed close to the main contacts inside the switching chamber. This can sometimes influence the arc quenching or cause insulation disadvantages. Furthermore, the monitoring contact formed by the cantilever and microswitch must be embodied to be leading. This means that the monitoring contact changes its state before the main contact closes. This is because the microswitch must still indicate the "closed" status when the overtravel has already been used up in a sticking situation. Intermediate states or blockages cannot be detected as a result. Another disadvantage is the service life of conventional microswitches, which can be only a few 100000 switching cycles, depending on the design. Furthermore, supply lines must be laid to the switch, which restricts the use of completely hermetically sealed ceramic discharge chambers.

Furthermore, for example from the publication WO 2008/033349 A2 an auxiliary switch is known, which is operated via a cantilever on the switching bridge, whereby, for example, two overlapping contacts can be pressed onto each other. This solution is simple, inexpensive and virtually wear-free. However, it has the disadvantage that the overlapping contacts are fitted between the main contacts, which can lead to insulation problems. Furthermore, lead wires must be laid to the auxiliary switch, which limits or makes impossible the use of completely hermetically sealed ceramic discharge chambers. The switching behavior is still similar to that of the microswitch.

In order to circumvent the described disadvantages, it is also known to attach a magnet to the lower part of the movable system and in particular outside the switching chamber, which can open and close a reed switch, as described, for example, in the publication JP 2013-008621 A. In this way, the detection takes place far away from the main contacts and the detection can also take place through non-magnetic materials. In addition, this solution can be easily used in conjunction with hermetically sealed ceramic discharge chambers. The switching behavior is analogous to the two previously described systems, but the difficulty of a properly adjusted overlap range arises because the indication is magnetic and hysteresis effects must also be taken into account. Another disadvantage is the sensitivity of the reed switch to magnetic interference fields and mechanical shocks.

As an improvement of this, it is known to use a Hall sensor instead of the reed switch, so that the magnetic detection is not done by a mechanical switch, but is enabled by a semiconductor device. As a result, magnetic interference fields no longer play a role and there is also no longer any vibration dependence. However, the switching behavior is similar to that of the reed switch.

All four monitoring switch solutions have a so-called "normally open" characteristic, i.e. the monitoring switch largely reflects the state of the main contacts. Inverting the signal, however, does not produce a "normally closed", but only a "not normally open". What all four principles have in common above all is that none of these solutions can reliably signal that the monitored contactor is safely and completely open. However, such a requirement is formulated in the IEC 60947-5-1 standard, which requires detection that closes a monitoring contact or indicates a closed monitoring contact ("normally closed") only when the contactor is in the rest position.

Such a solution is unheard of for gas-filled contactors.

SUMMARY

Embodiments provide a switching device.

According to at least one embodiment, a switching device has at least one fixed contact and at least one movable contact. The at least one fixed contact and the at least one movable contact are intended and embodied to switch on and off a load circuit that can be connected to the switching device. Particularly preferably, the switching device has at least two fixed contacts which, together with the movable contact, are intended and embodied to switch on and off a load circuit which can be connected to the switching device and, in particular, to the at least two fixed contacts. In the following, the switching device is mostly described with at least one fixed contact or with two fixed contacts. However, the number of fixed contacts may differ from the specifically mentioned numbers in the following embodiments and with respect to the features described below.

The movable contact can be moved in the switching device between a non-connecting state and a connecting state of the switching device in such a way that, in the non-connecting state of the switching device, the movable contact is spaced apart from the fixed contacts and is thus electrically insulated and, in the connecting state, has a mechanical contact to the at least two fixed contacts and is thus electrically connected to them. The fixed contacts are thus arranged separately from one another in the switching device and, depending on the state of the movable contact, can be electrically conductively connected to one another by the movable contact or electrically separated from one another. In the connecting state, the movable contact thus contacts with at least one contact surface at least one contact surface of at least one fixed contact. The distance of the movable contact, in particular of said contact surface of the movable contact, from the at least one fixed contact, in particular of said contact surface of the at least one fixed contact, in the non-connecting and thus separated state is also referred to here and in the following as the switching gap and indicates the maximum range of movement and thus the maximum achievable distance of the contacts and in particular of their contact surfaces from one another. In the case of two fixed contacts, for example, the previous description applies accordingly.

According to a further embodiment, the switching device has a switching chamber in which the movable contact and the fixed contacts are arranged. The movable contact can in particular be arranged completely in the switching chamber. The fact that a fixed contact is arranged in the switching chamber can in particular mean that at least a contact region of the fixed contact, which is in mechanical contact with the movable contact in the switched-through state, is arranged within the switching chamber. For connecting a supply line of a circuit to be switched by the switching device, a fixed contact arranged in the switching chamber can be electrically contacted from outside, i.e. from outside the switching chamber. For this purpose, a fixed contact arranged in the switching chamber can protrude with a part from the switching chamber and have a connection possibility for a supply line outside the switching chamber. The switching chamber thus preferably has openings through which the fixed contacts project into the switching chamber. The fixed contacts are, for example, soldered into the openings of the switching chamber and project both into the interior space of the switching chamber and out of the switching chamber.

According to a further embodiment, the switching device has at least two auxiliary contacts arranged in the switching chamber. The fact that an auxiliary contact is arranged in the switching chamber can mean in particular that at least a contact region of the auxiliary contact is arranged inside the switching chamber. For connecting a supply line, an auxiliary contact arranged in the switching chamber can be electrically contactable from outside, i.e. from outside the switching chamber. For this purpose, a part of an auxiliary contact arranged in the switching chamber can protrude from the switching chamber and have a connection option for a supply line outside the switching chamber. The switching chamber thus preferably has openings through which the auxiliary contacts project into the switching chamber. The auxiliary contacts are for example soldered into the openings of the switching chamber and project both into the interior space of the switching chamber and out of the switching chamber. The feed-through of the auxiliary contacts into the switching chamber can thus be carried out with a hermetically sealed and, for example, brazed connection comparable to the feed-through of the fixed contacts, which can preferably be done in a common manufacturing step and thus in a common process.

According to a further embodiment, the switching device has at least two spring contacts arranged in the switching chamber. Furthermore, the switching device has a contact plate that is arranged in the switching chamber. In particular, the spring contacts and the contact plate are arranged entirely in the switching chamber. Each of the spring contacts comprises at least a first contact region and a second contact region. With the first contact region, each of the spring contacts can contact one of the auxiliary contacts. In particular, each of the spring contacts can contact one of the auxiliary contacts with its first contact region permanently and independently of the switching states of the switching device during normal operation. In particular, the first contact region of a spring contact can contact an auxiliary contact directly and thus mechanically.

According to a further embodiment, the contact plate is movable together with the movable contact. Particularly preferably, the contact plate and the movable contact can be moved together with the same mechanical drive, which is described further below. Particularly preferably, the contact plate contacts the second contact regions of the spring contacts in a first switching state of the switching device and is arranged at a distance from the second contact regions of the spring contacts in a second switching state. The first switching state may particularly preferably be the non-connecting switching state of the switching device described above, while the second switching state may be the connecting switching state described above. In other words, the contact plate may contact the second contact regions of the spring contacts when the movable contact is spaced apart from the at least one fixed contact, while the contact plate may be spaced apart from the second contact regions of the spring contacts when the movable contact of the switching device contacts the at least one fixed contact. Alternatively, it may also be possible for the first switching state to also be the connecting switching state while the second switching state is the non-connecting switching state. In this case, the operation of the detection of a state of the switching device, which is possible by means of the auxiliary contacts, is embodied inverted in regard to the following description.

According to a further embodiment, the switching device has a housing in which the movable contact, the fixed contacts and the auxiliary contacts, the spring contacts and the contact plate are arranged. The fact that a fixed contact is arranged in the housing can mean, in particular, that at least a contact region of the fixed contact, which is in mechanical contact with the movable contact in the switched-through state, is arranged inside the housing. For connecting a supply line of a circuit to be switched by the switching device, a fixed contact arranged in the housing can be electrically contactable from outside, i.e. from outside the housing. For this purpose, a fixed contact arranged in the housing can protrude with a part from the housing and have a connection possibility for a supply line outside the housing. In particular, this can apply to any fixed switching contact. In particular, the movable contact can be arranged completely in the housing. Furthermore, the auxiliary contacts can preferably also be arranged completely in the housing. The auxiliary contacts can be contactable from the outside via feed lines within the housing, which are electrically conductively connected to external electrical connections on the housing, for example. Alternatively, an electrical component such as a microcontroller may be present in the housing, which is connected to the auxiliary contacts via electrical leads. The microcontroller can in turn be contactable from the outside via suitable connections on the housing.

According to a further embodiment, the contacts are arranged in a gas atmosphere in the housing. This can mean in particular that the movable contact, the spring contacts and the contact plate are arranged completely in the gas atmosphere in the housing and that furthermore at least parts of the fixed contacts, such as the contact regions of the fixed contacts, as well as at least parts of the auxiliary contacts, such as contact regions of the auxiliary contacts, are arranged in the gas atmosphere in the housing. Accordingly, the switching device may particularly preferably be a gas-filled switching device such as a gas-filled contactor. In particular, the gas atmosphere may promote quenching of arcs that may occur during switching operations. For example, the gas of the gas atmosphere may comprise or be a hydrogen and/or nitrogen containing gas, particularly at high pressure. Preferably, the gas may have a content of at least 50% $H_2$. In addition to hydrogen, the gas may have an inert gas, particularly preferably $N_2$ and/or one or more noble gases.

According to a further embodiment, the switching chamber is located inside the housing. Furthermore, in particular the gas, i.e. at least part of the gas atmosphere, can be located in the switching chamber.

According to a further embodiment, the movable contact and the contact plate are movable by means of a mechanical drive. The mechanical drive has in particular an armature. The armature can have a shaft that is connected at one end to the movable contact and the contact plate in such a way that the movable contact and the contact plate can be moved by means of the shaft, i.e. during a movement of the shaft are also moved by it. In particular, the shaft may project into the switching chamber through an opening in the switching chamber. In particular, the switching chamber may have a switching chamber base that has an opening through which the shaft projects. The armature may be movable by a magnetic circuit to effect the switching operations described above. For this purpose, the magnetic circuit may have a yoke that has an opening through which the shaft of the armature protrudes. When the magnetic circuit is switched on, the armature, in particular a magnetic core of the armature, can be pulled toward the yoke.

According to a further embodiment, the movable contact and the contact plate are arranged on an electrically insulating contact holder. The contact holder can particularly preferably be arranged and fastened to the shaft of the armature and electrically insulate the movable contact and the contact plate from the shaft. This allows the movable contact and the contact plate to be electrically insulated from the components of the mechanical drive, i.e. in particular from the components of the armature. For this purpose, the contact holder may comprise or be made of an electrically insulating material. The electrically insulating material can be selected from polymers and ceramic materials, for example selected from polyoxymethylene (POM), in particular with the structure $(CH_2O)_n$, polybutylene terephthalate (PBT), glass-fiber-filled PBT and electrically insulating metal oxides such as $Al_2O_3$.

According to a further embodiment, the contact plate is fixed to the contact holder. The fixation can be done, for example, by means of a clamp. Particularly preferably, the material of the contact holder is molded partially around the contact plate. For this purpose, the contact plate can be overmolded by casting or injection molding with the material of the contact holder, for example. Contact regions of the contact plate can protrude from the contact holder for contacting the second contact regions of the spring contacts.

During a switching operation, the armature, the shaft as well as the movable contact and the contact plate preferably move in a linear motion in the form of a lifting and lowering motion along the shaft. Preferably, the shaft and, for example, a magnetic core of the armature have a range of motion in the vertical direction for the lifting movement that is larger than the switching gap described further above. This can be made possible, for example, by a gap between the magnetic core and the yoke, which can also be referred to as the movement gap, being larger than the switching gap in the switched-off state. Thus, the armature with the movable contact can be an overtravel system in which the movable contact is slidably arranged on the contact holder. Furthermore, a contact spring can be arranged on the contact holder, which exerts a spring force on the movable contact in a direction towards the fixed contacts. When the movable contact comes into contact with the fixed contacts and thus when the switching gap is completely closed, the contact spring can be compressed and the armature can move further until, for example, the magnetic core is in contact with the yoke. For example, the movement gap can be larger than the switching gap by less than or equal to 1 mm and especially preferably by about 0.5 mm. The compression of the contact spring due to the overtravel can increase the contact pressure of the movable contact against the fixed contacts and a certain insensitivity to vibrations and mechanical shocks can be achieved.

Due to the described design of the mechanical drive and the switching chamber it can be achieved that the auxiliary contacts, the spring contacts and the contact plate are electrically insulated from the fixed contacts, the movable contact and the mechanical drive. In particular, a permanent insulation can be achieved, i.e. a continuously ensured insulation during normal operation of the switching device and thus during the first and second switching states as well as during the transitions between them.

At least one of the contact regions of each of the spring contacts may be spring-loaded. For example, the first contact region of each spring contact may be spring-loaded and exert a spring force on an auxiliary contact. In other words, a first contact region may press against an auxiliary contact when installed to exert the spring force. Alternatively or additionally, the second spring regions may be spring-loaded. Particularly preferably, the second contact regions can exert a spring force on the contact plate in the first switching state. In this case, the spring force of the second contact regions can be lower than the spring force of the contact spring. Due to the resilient effect of the second contact regions, an increased insensitivity of the mechanical contact between the contact plate and the second contact regions of the spring contacts in regard to vibrations and mechanical shocks can be achieved. Particularly preferably, the spring force of the second contact regions on the contact plate and thus the counterpressure on the armature and in particular on the contact holder can be lower than the restoring spring force which a restoring spring of the mechanical drive has and by means of which the armature can be moved from the connecting switching state to the non-connecting switching state. Particularly preferably, the spring force of the second contact regions on the contact plate can be less than or equal to 20% of the restoring spring force.

Particularly preferably, the movable contact can be separated from the fixed contacts by the switching gap in the first or second switching state, as described further above, and the contact plate can lose a mechanical contact to the second contact regions of the spring contacts after covering a distance that is smaller than or equal to 20% of the switching gap during a transition of the switching device from the first to the second switching state. Thus, it can be achieved that the distance the armature has to travel before the contact between the contact plate and the spring contacts breaks off is very small.

The direction of movement of the movable contact corresponding to the main extension direction of the shaft, i.e. the direction of the lifting and lowering movement of the movable contact, can also be referred to as the vertical direction here and in the following. The fixed contacts are arranged juxtaposed along a longitudinal direction, the longitudinal direction being in a horizontal plane perpendicular to the vertical direction. The movable contact may be plate-shaped, for example, and have a main extension plane parallel to the horizontal plane. Perpendicular to the vertical and longitudinal directions, a transversal direction is defined so that the horizontal plane is spanned by the longitudinal and transversal directions. The auxiliary contacts are preferably arranged along the transversal direction, and the movable contact may be arranged in particular along the transversal direction between the auxiliary contacts.

According to a further embodiment, the switching chamber comprises a switching chamber wall. The switching chamber wall may preferably have a rectangular cross-sectional shape or at least a cross-sectional shape approximating a rectangle in a horizontal sectional view, i.e., in a sectional view with a sectional plane perpendicular to the vertical direction. In particular, the switching chamber wall may have longitudinal sidewall parts opposing each other and transversal sidewall parts opposing each other that, in a horizontal sectional view, provide the rectangular shape with respect to their outer and/or inner contours. In other words, a longitudinal sidewall part may extend substantially in vertical and longitudinal directions, while a transversal sidewall part may extend substantially in vertical and transversal directions. Here, preferably, the longitudinal sidewall parts, the transversal sidewall parts, and a lid part having openings for the fixed contacts and openings for the auxiliary contacts may be integrally formed to form the switching chamber wall. The switching chamber may additionally have a switching chamber base which, together with the switching chamber wall, forms the switching chamber. Alternatively, the sidewall parts may be integrally formed with the switching chamber base. Furthermore, the sidewall parts without a lid part and without the switching chamber base can form the switching chamber wall, which together with the separately manufactured lid part and the separately manufactured switching chamber base forms the switching chamber.

According to a further embodiment, each of the spring contacts has a connection region between the first and second contact regions that extends along a longitudinal sidewall part. The first and second contact regions of each of the spring contacts may preferably extend from the respective longitudinal sidewall part into the interior space of the switching chamber along at least one transversal direction.

According to a further embodiment, the switching chamber has at least two webs, each of which is arranged in the longitudinal direction between the at least two fixed contacts and each of which extends from at least one longitudinal sidewall part in the transversal direction into the switching chamber. In this case, the webs are spaced apart from each other in the longitudinal direction. In particular, the two webs may extend in the transversal direction across the movable contact in the interior space of the switching chamber from one of the longitudinal sidewall parts to the other of the longitudinal sidewall parts. In this regard, the at least two webs may each have a recess in which the movable contact can move during switching operations. Further, the webs may be directly adjacent to a lid part of the switching chamber. In particular, the webs may extend along and directly adjacent a lid part of the switching chamber. The webs may particularly preferably be integrally formed with the sidewall parts and/or a lid part of the switching chamber.

The at least two webs can be used to form one or more compartments in the interior space of the switching chamber between the fixed contacts, which compartment or compartments is or are at least partially separated from the fixed contacts and thus electrically insulated. In the at least one insulated compartment formed in this way and thus in the longitudinal direction between the two webs, in particular the auxiliary contacts and the spring contacts can be arranged. Particularly preferably, the auxiliary contacts can be arranged between the two webs symmetrically with respect to the movable contact, i.e. symmetrically with respect to a symmetry plane spanned by the longitudinal and the vertical direction. Furthermore, the spring contacts between the two webs may be arranged symmetrically with respect to the movable contact. By forming at least one of the webs between each of the auxiliary contacts and the fixed contacts, and between each of the spring contacts and the fixed contacts, the auxiliary contacts and the spring contacts may be at least partially insulated from the fixed contacts. Furthermore, other auxiliary components can be arranged in the insulated compartment thus formed, such as a gas filling nozzle for filling the gas described above to form the gas atmosphere in the switching chamber.

According to a further embodiment, the switching chamber base has wall parts which are arranged in the longitudinal direction between the webs of the switching chamber wall and between which the spring contacts are arranged. In particular, the wall parts can be arranged inserted between the webs and form an intermediate space in which the spring contacts are partially arranged. Furthermore, the contact regions of the contact plate may be arranged in this intermediate space and may move within the intermediate space when changing from the first to the second switching operation and vice versa. The wall parts of the switching chamber base may form the at least one insulated compartment described above together with the webs.

According to a further embodiment, the auxiliary contacts and/or the spring contacts and/or the contact plate have a material with copper or a copper alloy. Particularly preferably, the material can be selected from CuBe, $CuSn_4$, $CuSn_6$. Such a material may have a good electrical conductivity and a low welding tendency. Furthermore, the auxiliary contacts, for example, can have the same material as the fixed contacts.

In the switching device described herein, it can be achieved that the auxiliary contacts are electrically connected to each other by the spring contacts and the contact plate in the first switching state and electrically separated from each other in the second switching state. By measuring the electrical resistance between the auxiliary contacts, the first switching state, which particularly preferably corresponds to the non-connecting switching state, and the second switching state, which particularly preferably corresponds to the connecting switching state, can thus be determined.

BRIEF DESCRIPTION OF THE DRAWINGS

Further advantages, advantageous embodiments and developments are revealed in the exemplary embodiments described below in association with the figures.

DETAILED DESCRIPTION OF ILLUSTRATIVE EMBODIMENTS

In the exemplary embodiments and figures, identical, similar or identically acting elements may each be denoted by the same reference signs. The elements illustrated and their mutual proportions should not be considered true to scale; instead, individual elements, for example layers, components, structural elements and regions, may be shown exaggerated in size for better illustration and/or for better understanding.

Figure 1:
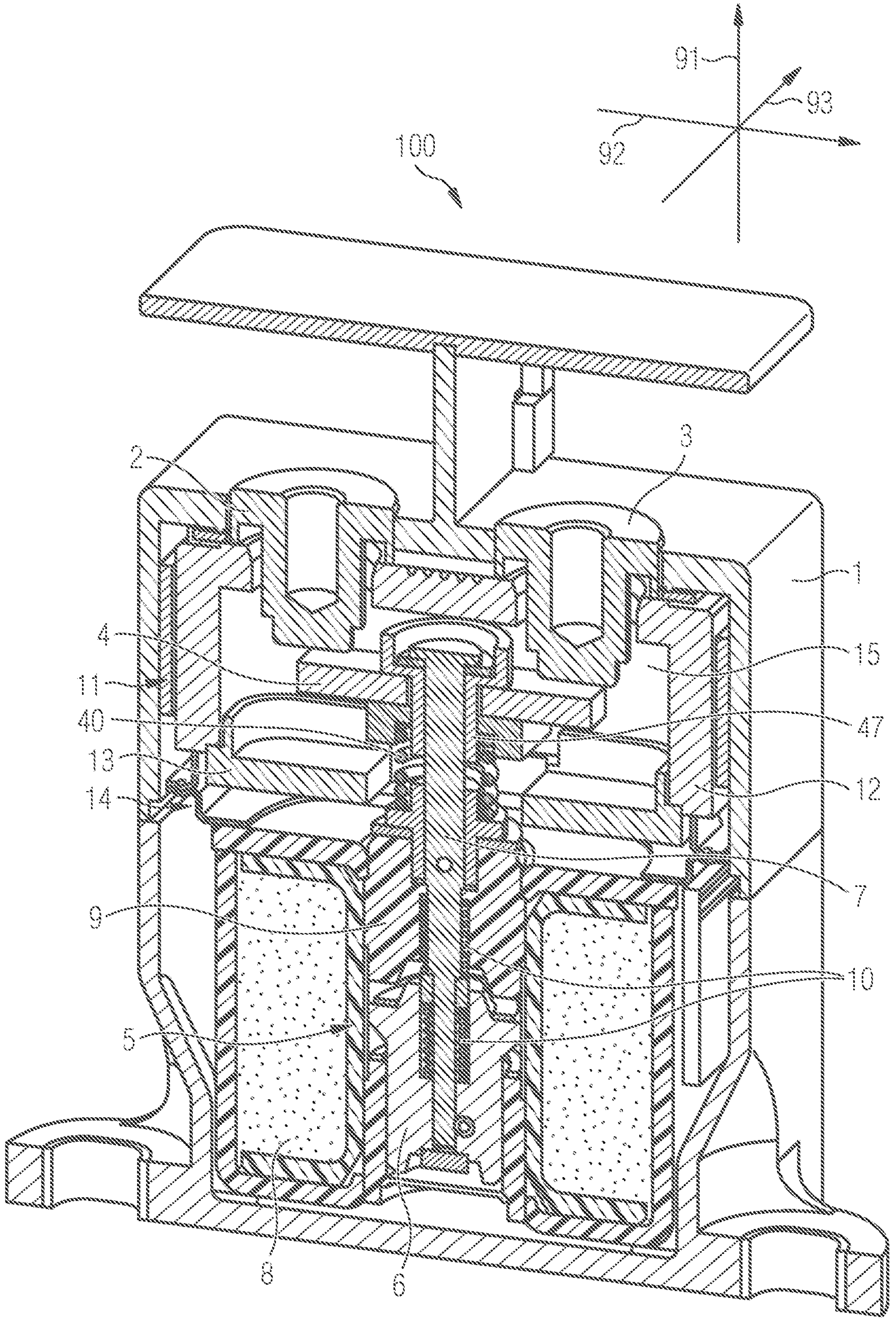
FIG. 1 shows a schematic illustration of a switching device.

FIG. 1 shows an example of a switching device 100 which can be used, for example, for switching strong electrical currents and/or high electrical voltages and which can be a relay or contactor, in particular a power contactor. FIG. 1 shows a three-dimensional sectional view with a vertical sectional plane. The geometries shown are only exemplary and are not to be understood as limiting and can also be embodied alternatively.

The exemplary switching device 100 has two fixed contacts 2, 3 and a movable contact 4 in a housing 1. The movable contact 4 is embodied as a contact plate. The fixed contacts 2, 3 together with the movable contact 4 form the switching contacts. Alternatively to the number of contacts shown, other numbers of fixed and/or movable contacts may be possible. The housing 1 serves primarily as touch-protection for the components arranged inside and has a plastic or is made of it, for example PBT or glass fiber-filled PBT. The fixed contacts 2, 3 and/or the movable contact 4 may, for example, be made with or of Cu, a Cu alloy, one or more refractory metals such as Wo, Ni and/or Cr, or a mixture of said materials, for example of copper with at least one other metal, for example Wo, Ni and/or Cr.

In FIG. 1, the switching device 100 is shown in a resting state in which the movable contact 4 is spaced apart from the fixed contacts 2, 3, so that the contacts 2, 3, 4 are electrically insulated from each other. The shown embodiment of the switching contacts and in particular their geometry are to be understood as purely exemplary and not limiting. Alternatively, the switching contacts can also be embodied differently.

The switching device 100 has a mechanical drive with a movable armature 5, which essentially performs the switching movement. The magnetic armature 5 has a magnetic core 6, for example with or made of a ferromagnetic material. Furthermore, the armature 5 has a shaft 7 which is guided through the magnetic core 6 and is fixedly connected to the magnetic core 6 at one end of the shaft. At the other end of the shaft opposite the magnetic core 6, the armature 5 has the movable contact 4, which is supported by a contact spring 40 and is also connected to the shaft 7. The shaft 7 can preferably be made with or of stainless steel. To electrically insulate the movable contact 4 from the shaft 7, an electrically insulating contact holder 47, which can also be referred to as a bridge insulator, can be arranged between them.

The magnetic core 6 is surrounded by a coil 8. A current flow in the coil 8, which can be switched on from the outside by a control circuit, generates a movement of the magnetic core 6 and thus of the entire armature 5 in the axial direction until the movable contact 4 makes contact with the fixed contacts 2, 3. In the illustration shown, the armature moves upward. The armature 5 thus moves from a first position, which corresponds to the resting state shown and at the same time to the disconnecting, i.e. non-through-connecting and thus switched-off switching state, to a second position, which corresponds to the active, i.e. through-connecting and thus switched-on switching state. In the active state, the contacts 2, 3, 4 are galvanically connected to each other.

For guiding the shaft 7 and thus the armature 5, the switching device 100 has a yoke 9, which may comprise or be pure iron or a low-doped iron alloy and which forms part of the magnetic circuit. The yoke 9 has an opening in which the shaft 7 is guided. When the current flow in the coil 8 is interrupted, the armature 5 is moved back to the first position by one or more springs 10, which may also be referred to as return springs. In the embodiment shown, the armature 5 thus moves back down. The switching device 100 is then again in the resting state in which the contacts 2, 3, 4 are open.

The direction of movement of the armature 5 and thus of the movable contact 4 is also referred to as the vertical direction 91 in the following. The direction of arrangement of the fixed contacts 2, 3, which is perpendicular to the vertical direction 91, is hereinafter referred to as the longitudinal direction 92. The direction perpendicular to the vertical direction 91 and perpendicular to the longitudinal direction 92 is hereinafter referred to as the transversal direction 93. The directions 91, 92 and 93, which also apply independently of the described switching movement, are indicated in the figures to facilitate orientation.

For example, when opening the contacts 2, 3, 4, at least one electric arc can be generated which can damage the contact surfaces of the contacts 2, 3, 4. As a result, there may be a risk that the contacts 2, 3, 4 may "stick" to each other due to a welding caused by the arc and may no longer be separated from each other. The switching device 100 then continues to be in the switched-on state, although the current in the coil 8 is switched off and thus the load circuit should be disconnected. In order to prevent such arcs from occurring, or at least to assist in quenching arcs that do occur, the contacts 2, 3, 4 are arranged in a gas atmosphere, so that the switching device 100 is embodied as a gas-filled relay or gas-filled contactor. For this purpose, the contacts 2, 3, 4 are arranged within a switching chamber 11 formed by a switching chamber wall 12 and a switching chamber base 13, in a gas-tight region 14 formed by a hermetically sealed part, wherein the switching chamber 11 may be part of the gas-tight region 14. The gas-tight region 14 is substantially formed by portions of the switching chamber 11, the yoke 9, and additional walls. The gas-tight region 14 completely surrounds the armature 5 and the contacts 2, 3, 4, except for parts of the fixed contacts 2, 3 provided for external connection. The gas-tight region 14 and thus also the interior space 15 of the switching chamber 11 are filled with a gas. The gas that can be filled into the gas-tight region 14 through a gas filling nozzle as part of the manufacture of the switching device 100 can particularly preferably be hydrogen-containing, for example with 20% or more $H_2$ in an inert gas or even with 100% $H_2$, since hydrogen-containing gas can promote the quenching of arcs.

Outside the switching chamber 11, permanent magnets (not shown), so-called blow magnets, can additionally be present, for example, which are intended and embodied for deflecting the arcs. In particular, the blow magnets cause an extension of the arc length and can thus improve the quenching of the arcs.

The switching chamber wall 12 and the switching chamber base 13 can, for example, be made with or from a metal oxide such as $Al_2O_3$. Furthermore, plastics with a sufficiently high temperature resistance are also suitable, for example a PEEK, a PE and/or a glass fiber-filled PBT. Alternatively or additionally, the switching chamber 11 can also at least partially comprise a POM, in particular with the structure $(CH_2O)_n$. Such a plastic may be characterized by a comparatively low carbon content and a very low tendency to form graphite. Due to the equal proportions of carbon and oxygen, particularly in the case of $(CH_2O)_n$, predominantly gaseous CO and $H_2$ can be formed during a heat-induced and, in particular, an arc-induced decomposition. The additional hydrogen can enhance arc quenching.

In connection with the following figures, embodiments of the switching device 100 as well as of components thereof are described, which allow a detection of the switching states, wherein the switching device according to the following description can be embodied like the switching device described in connection with FIG. 1, except for the features described below. For easier recognition of the orientations and of sectional planes, the directions 91, 92, 93 are indicated in the following figures.

Figure 2A:
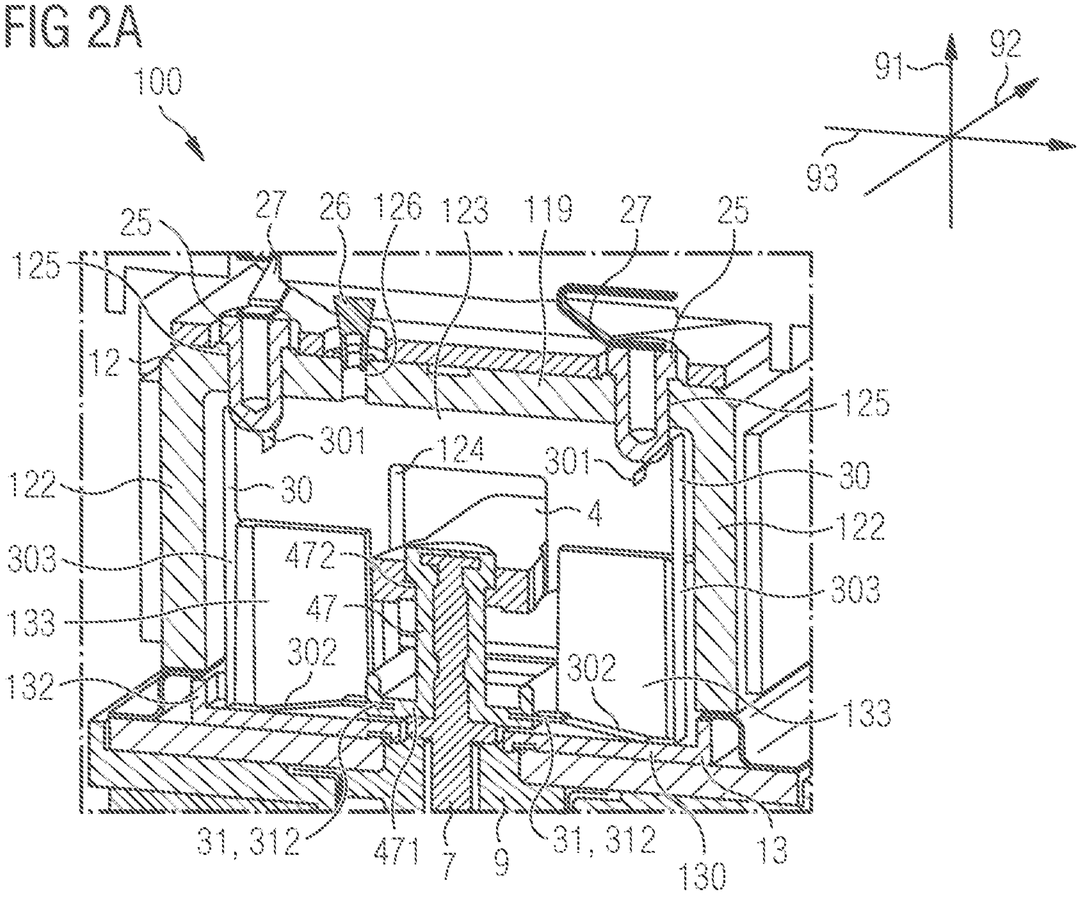
FIGS. 2A and 2B show schematic illustrations of a part of a switching device according to an embodiment.
Figure 2B:
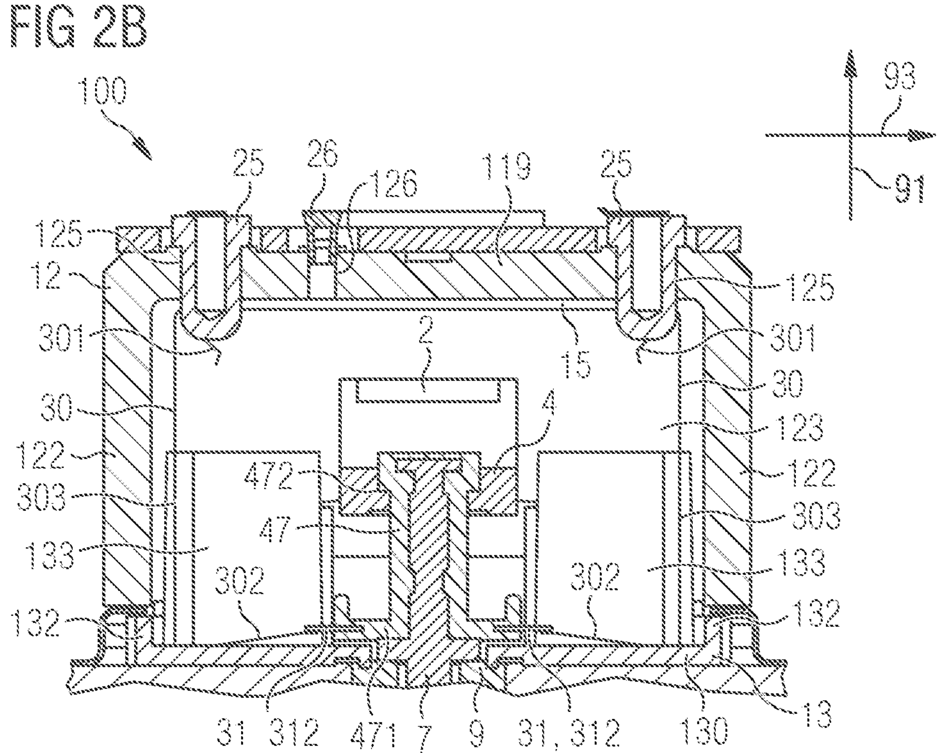
Figure 2C:
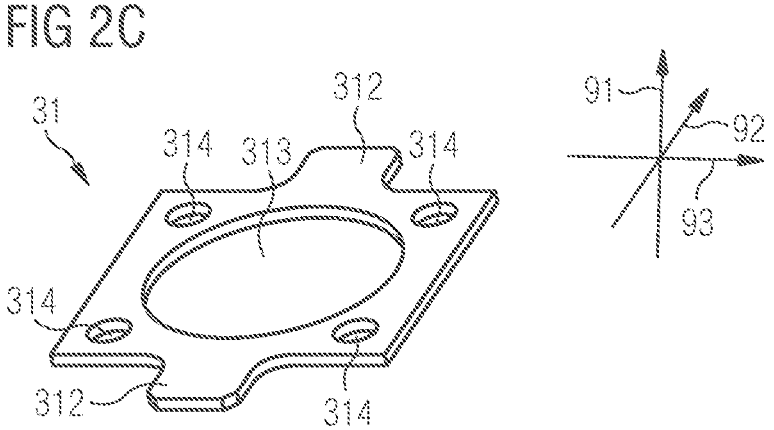
FIG. 2C shows a schematic illustration of a contact plate of the switching device according to a further embodiment.
Figure 2D:
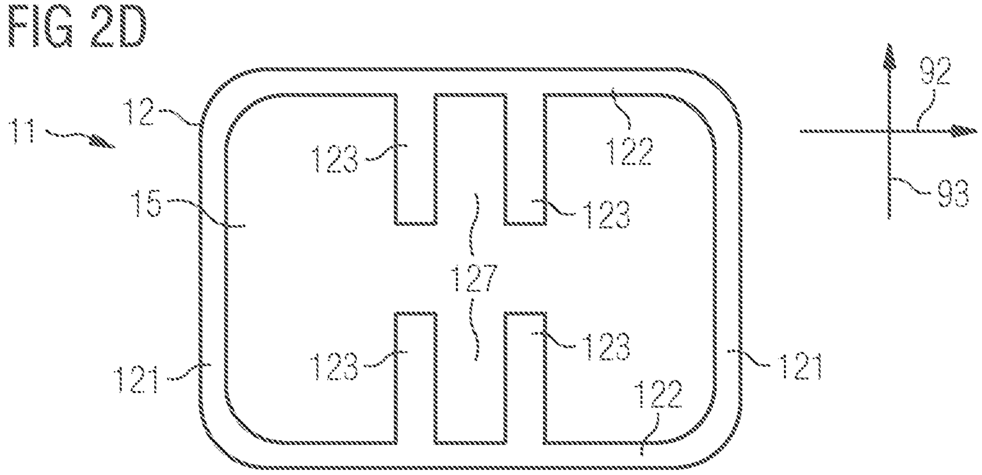
FIGS. 2D to 2F show schematic illustrations of the switching chamber wall of the switching device according to a further embodiment.
Figure 2E:
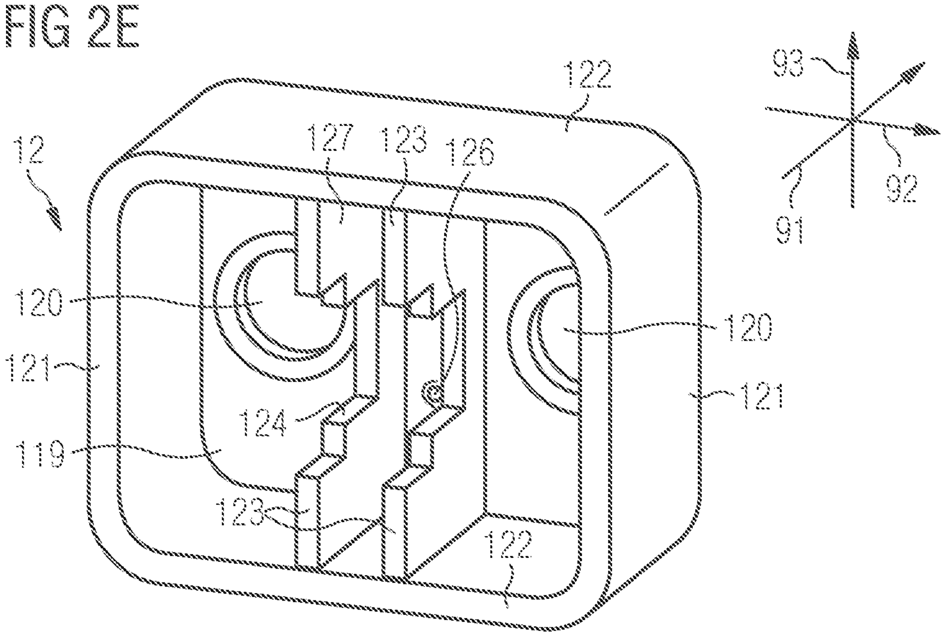
Figure 2F:
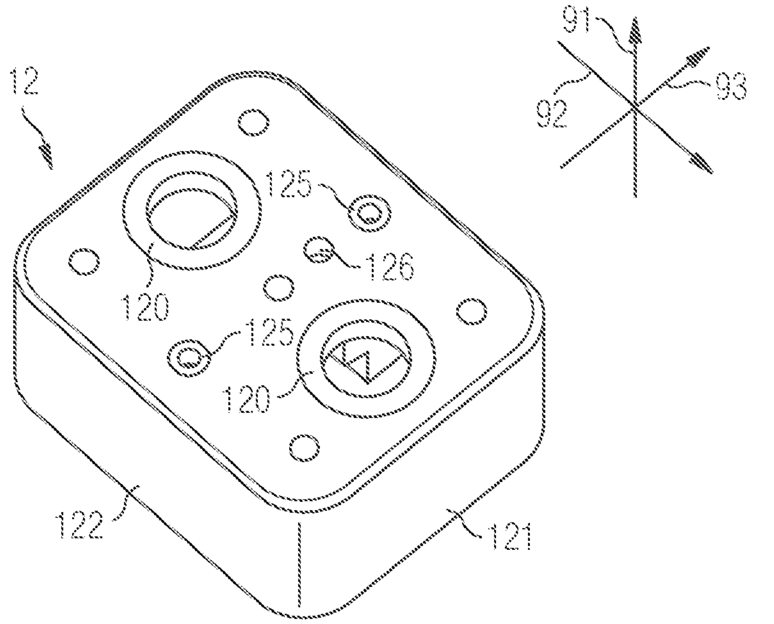
Figure 2G:
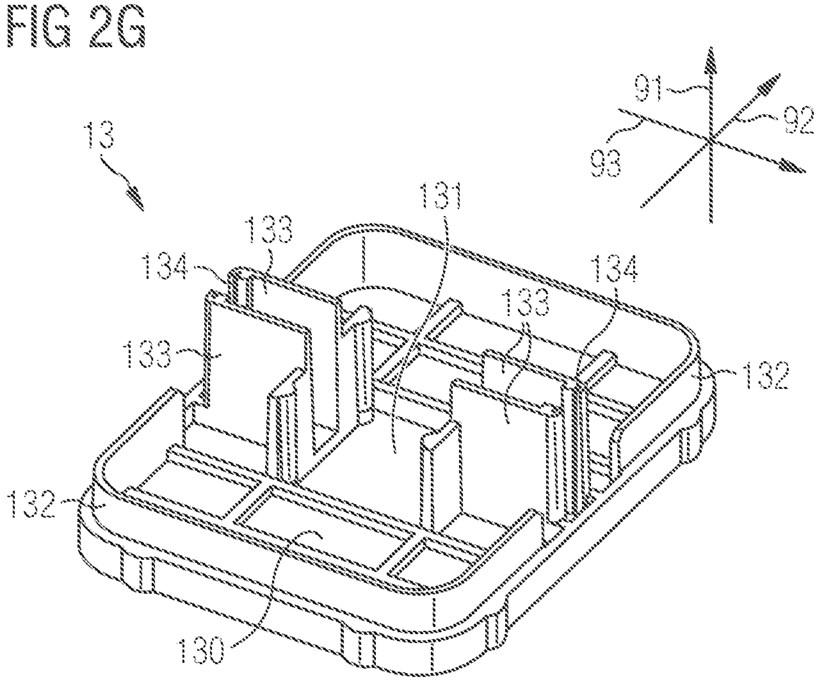
FIG. 2G shows a schematic illustration of a switching chamber base of the switching device according to a further embodiment.

FIGS. 2A and 2B show sections of the switching device 100 by means of a three-dimensional sectional view and a two-dimensional sectional view, in which essentially the region of the switching chamber 11 is shown. The sectional planes of the illustration of FIGS. 2A and 2B are each perpendicular to the longitudinal direction 92. In FIG. 2C, the contact plate 31 is shown. FIGS. 2D to 2F show various views of the switching chamber 11 and the switching chamber wall 12, while FIG. 2G shows the switching chamber base 13. The following description refers equally to FIGS. 2A to 2G.

In comparison to the switching device of FIG. 1, the embodiment shown in FIGS. 2A to 2G has two auxiliary contacts 25 which are arranged in openings 125 of the switching chamber wall 12 and which, like the fixed contacts 2, 3, project into the interior space 15 of the switching chamber 11.

Between the auxiliary contacts 25, which are arranged along the transversal direction 93, a further opening 126 is formed in the shown embodiment, in which a gas filling nozzle 26 is arranged. The gas filling nozzle 26 can be used for filling the gas of the gas atmosphere into the gas-tight region and can be closed after filling, for example, by squeezing.

The auxiliary contacts 25 and also the gas filling nozzle 26 are preferably soldered into the openings 125, 126 of the switching chamber 11, so that the feed-through of the auxiliary contacts 25 and also of the gas filling nozzle 26 into the switching chamber 11 takes place with a hermetically sealed and, for example, brazed connection comparable with the feed-through of the fixed contacts 2, 3. The assembly of the contacts 2, 3 and the auxiliary contacts 25 as well as the gas filling nozzle 26 can preferably be carried out in a single process.

The auxiliary contacts 25 are arranged completely in the housing. The auxiliary contacts 25 can be contacted from the outside via supply lines 27 inside the housing, which are electrically conductively connected to external electrical connections on the housing, for example.

Furthermore, the switching device 100 has two spring contacts 30 and a contact plate 31 arranged in the switching chamber 11. In particular, the spring contacts 30 and the contact plate 31 are arranged entirely within the interior space 15 of the switching chamber 11. Each of the spring contacts 30 extends from an auxiliary contact 25 to the contact plate 31 and has at least a first contact region 301 and a second contact region 302. With its first contact region 301, each of the spring contacts 30 contacts one of the auxiliary contacts 25. In particular, with its respective first contact region 301, each of the spring contacts 30 can permanently contact one of the auxiliary contacts 25 during normal operation, regardless of the switching states of the switching device 100. As can be seen, the first contact regions 301 of the spring contacts 30 are directly and thus mechanically in contact with the auxiliary contacts 25.

The contact plate 31 is movable together with the movable contact 4. For this purpose, the contact plate 31 and the movable contact 4 are jointly connected to the mechanical drive described above in connection with FIG. 1. In a first switching state of the switching device 100 shown in FIGS. 2A and 2B, the contact plate 31 contacts the second contact regions 302 of the spring contacts 30. For this purpose, the contact plate 31 comprises contact regions 312, as shown in FIG. 2C. In the first switching state, the second contact regions 302 of the spring contacts 30 are in mechanical and thus galvanic contact with the contact regions 312 of the contact plate 31, so that the spring contacts 30 and thus also the auxiliary contacts 25 are electrically conductively connected to one another by the contact plate 31.

As described further below, in a second switching state, the contact plate 30 is spaced apart from the second contact regions 302 of the spring contacts 30. In the embodiment shown, the first switching state is the non-connecting switching state of the switching device 100 described above, in which the movable contact 4 is spaced apart from the fixed contacts 2, 3 and accordingly a switching gap is present between the movable contact 4 and the fixed contacts 2, 3.

The movable contact 4 and the contact plate 31 are arranged on an electrically insulating contact holder 47. The contact holder 47 has an opening, into which the shaft 7 is inserted, and is attached to the shaft 7 of the armature 5 and thus of the mechanical drive of the switching device 100. The contact holder 47 can be formed in one or more pieces.

The movable contact 4 and the contact plate 31 are electrically insulated from the shaft 7 by the contact holder 47. As a result, the movable contact 4 and the contact plate 31 are electrically insulated from the components of the mechanical drive, i.e. in particular from the components of the armature 5. For this purpose, the contact holder has or is made of an electrically insulating material selected, for example, from polymers and ceramic materials such as, for example, polyoxymethylene (POM), in particular with the structure $(CH_2O)_n$, polybutylene terephthalate (PBT), glass fiber-filled PBT and electrically insulating metal oxides such as $Al_2O_3$.

The contact plate 31 is fixed to the contact holder 47. Fixation can be effected, for example, by means of clamping or, as shown, particularly preferably by molding. For this purpose, the contact plate 31 is partially overmolded by the material of the contact holder 47, for example by casting or injection molding. For contacting the second contact regions 302 of the spring contacts 30, the contact regions 312 of the contact plate 31 project out of the contact holder 47 in the transversal direction 93.

As shown in FIG. 2C, the contact plate 31 is, for example, disc-shaped and has a central opening 313 through which the shaft 7 projects in the assembled state. Furthermore, as shown, the contact plate 31 may have anchoring holes 314 through which the material of the contact holder 47 can engage, wherein the contact plate 31 can be fixed to the contact holder 47 and secured against rotation, for example.

The contact holder 47 further comprises a lower mechanical stop 471 and an upper mechanical stop 472. The contact plate 31 is arranged in the lower mechanical stop 471, which can rest on the switching chamber base 13 in the first switching state. The movable contact 4 rests against the upper mechanical stop 472 in the first switching state. Between the movable contact 4 and the lower mechanical stop 471 the contact spring 40 described in FIG. 1 is arranged, which is not shown for clarity in FIGS. 2A and 2B and which presses the movable contact 4 against the upper mechanical stop 472 and thus in the direction of the fixed contacts 2, 3.

The armature with the movable contact 4 is an overtravel system in which the movable contact 4 is slidably arranged on the contact holder 47. When the movable contact 4 comes into contact with the fixed contacts 2, 3 and, thus, when the switching gap is completely closed, the contact spring can compress and the armature can move further until, for example, the magnetic core is in contact with the yoke. For example, the armature can move upward further than the movable contact 4 in the vertical direction 91 by a distance of less than or equal to 1 mm, and particularly preferably of about 0.5 mm. By compressing the contact spring due to the overtravel, the contact pressure of the movable contact 4 on the fixed contacts 2, 3 can be increased and a certain insensitivity to vibrations and mechanical shocks can be achieved.

The switching chamber wall 12 has a rectangular cross-sectional shape, or at least a cross-sectional shape approximating a rectangle, in the horizontal sectional view, as shown in particular in FIGS. 2D to 2F, which may have rounded corners, for example, as shown. The switching chamber wall 12 has transversal sidewall parts 121 opposing each other and longitudinal sidewall parts 122 opposing each other that provide the at least approximated rectangular shape. The transversal sidewall parts 121, the longitudinal sidewall parts 122 and a lid part 119 having openings 120 for the fixed contacts 2, 3 and having openings 125, 126 for the auxiliary contacts 25 and the gas filler neck 26 are integrally formed as indicated in the shown embodiment and form the switching chamber wall 12. Alternatively, the sidewall parts 121, 122 may also be integrally formed with the switching chamber base 13. Furthermore, the sidewall parts 121, 122 may form the switching chamber wall 12 without a lid part and without the switching chamber base, which may then form the switching chamber 11 together with the separately fabricated lid part and the separately fabricated switching chamber base 13. Particularly preferably, the switching chamber wall 12 is formed of a ceramic material mentioned above.

Each of the spring contacts 30 includes a connection region 303 between the first and second contact regions 301, 302, which connection region 303 extends along a longitudinal sidewall part 122, as shown in FIGS. 2A and 2B. The first and second contact regions 301, 302 of each of the spring contacts 30 may preferably extend from the respective longitudinal sidewall part 122 at least along the transversal direction 93 into the interior space 15 of the switching chamber 11.

The spring contacts 30 and/or the contact plate 31 preferably have a material with copper or a copper alloy. Particularly preferably, the material may be selected from CuBe, $CuSn_4$, $CuSn_6$. Such a material may have a good electrical conductivity and a low tendency to weld. The auxiliary contacts 25 can be formed from a material described above for the fixed contacts 2, 3 or from a material described for the spring contacts 30 and/or contact plate 31.

The spring contacts 30 are preferably strip-shaped, in particular as metal strips, as shown. At least one of the contact regions 301, 302 of each of the spring contacts 30 may be spring-loaded. For example, the first contact region 301 of each spring contact 30 may be spring-loaded and exert a spring force on an auxiliary contact 25. Thus, in the assembled state, the first contact portion 301 may press against an auxiliary contact 25 to exert the spring force.

Furthermore, the second spring areas 302 are alternatively or additionally spring-loaded. Particularly preferably, the second contact regions 302 exert a spring force on the contact plate 31 and in particular on the contact regions 312 thereof in the first switching state. Due to the resilient effect of the second contact regions 302, an increased insensitivity of the mechanical contact between the contact plate 31 and the second contact regions 302 of the spring contacts 30 to vibrations and mechanical shocks can be achieved. Particularly preferably, the spring force of the second contact regions 302 on the contact plate 31 and thus the counter-pressure on the armature and in particular the contact holder 47 can be lower than the return spring force of a return spring of the mechanical drive which moves the armature from the through-switching switching state to the non-through-switching switching state. Particularly preferably, the spring force of the second contact regions 302 on the contact plate 31 may be less than or equal to 20% of the reset spring force.

As can be seen in particular in FIGS. 2D and 2E, the switching chamber 11 has at least two webs 123, each of which is arranged in the longitudinal direction 92 between the at least two fixed contacts 2, 3 and each of which extends from at least one longitudinal sidewall part 122 in the transversal direction 93 into the switching chamber 11. The webs 123 are spaced apart from each other in the longitudinal direction 92. In particular, the webs 123 extend transversally 93 across the movable contact 4 in the interior space 15 of the switching chamber 11 from one of the longitudinal sidewall parts 122 to the other of the longitudinal sidewall parts 122. Further, the webs 123 each include a recess 124 in which the movable contact 4 can move during switching operations. As shown, the webs 123 can preferably be directly adjacent to the lid part 119 of the switching chamber wall 12. In particular, the webs 123 may extend along and immediately adjacent the lid part 119 of the switching chamber 11. The webs 123 are particularly preferably integrally formed with the sidewall parts 122 and the lid part 119 of the switching chamber 11.

The webs 123 form a region in the interior space 15 between the fixed contacts 2, 3 which is at least partially separated from the fixed contacts 2, 3 and thus electrically insulated. In the accordingly formed insulated compartment 127 the auxiliary contacts 25, the spring contacts 30 and also the gas filling nozzle 26 are arranged.

Particularly preferably, the auxiliary contacts 25 are arranged between the two webs 123 symmetrically to the movable contact 4. Accordingly, the spring contacts 30 are also arranged between the two webs 123 symmetrically to the movable contact 4. Due to the fact that at least one of the webs 123 is formed between each of the auxiliary contacts 25 and the fixed contacts 2, 3 and between each of the spring contacts 30 and the fixed contacts 2, 3, the auxiliary contacts 25 and the spring contacts 30 are at least partially insulated from the fixed contacts 2, 3.

As shown in FIG. 2G, the switching chamber base 13, which is particularly preferably formed from POM, has a base plate 130 with an opening 131 for the shaft 7 to pass through. At least partially circumferentially around the edge of the bottom plate 130, the switching chamber base 13 has sidewall parts 132 that can continue the sidewall parts 121, 122 of the switching chamber wall 12 when the switching chamber 11 is assembled. The bottom plate 130 may serve as a counter mechanical stop for the lower mechanical stop 471 of the contact holder 47, at least in some regions around the opening 131. For mechanical stabilization, the bottom plate 130 may for example additionally include intersecting webs as shown.

Furthermore, the switching chamber base 13 has wall parts 133 on both sides of the opening 131, which are arranged side by side along the longitudinal direction 92 between the webs 123 of the switching chamber wall 12 and between which the spring contacts 30 are arranged. In particular, the wall parts 133 are arranged inserted between the webs 123 and form an intermediate space in which the spring contacts 30 are partially arranged. For fixing the spring contacts 30, as can be seen in FIG. 2G, fixing grooves 134 may be provided in the wall portions 133. Furthermore, the contact regions 312 of the contact plate 31 are arranged in this intermediate space and move in vertical direction 91 within this intermediate space when changing from the first to the second switching operation and vice versa.

Figure 3A:
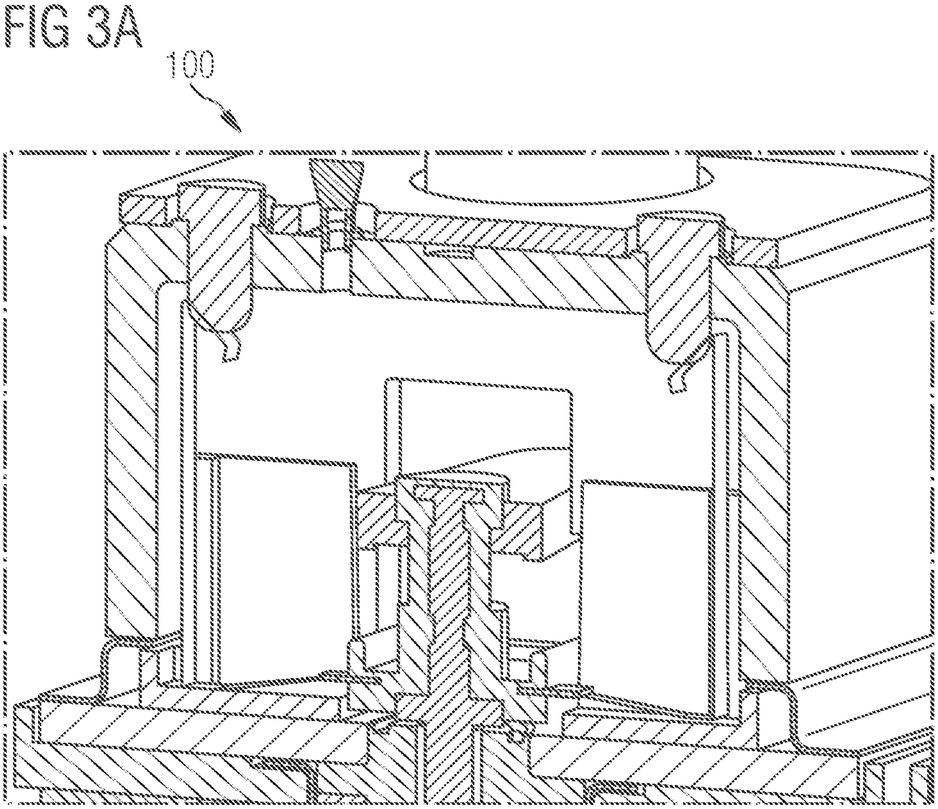
FIGS. 3A and 3B show schematic illustrations of a part of a switching device in various switching states.
Figure 3B:
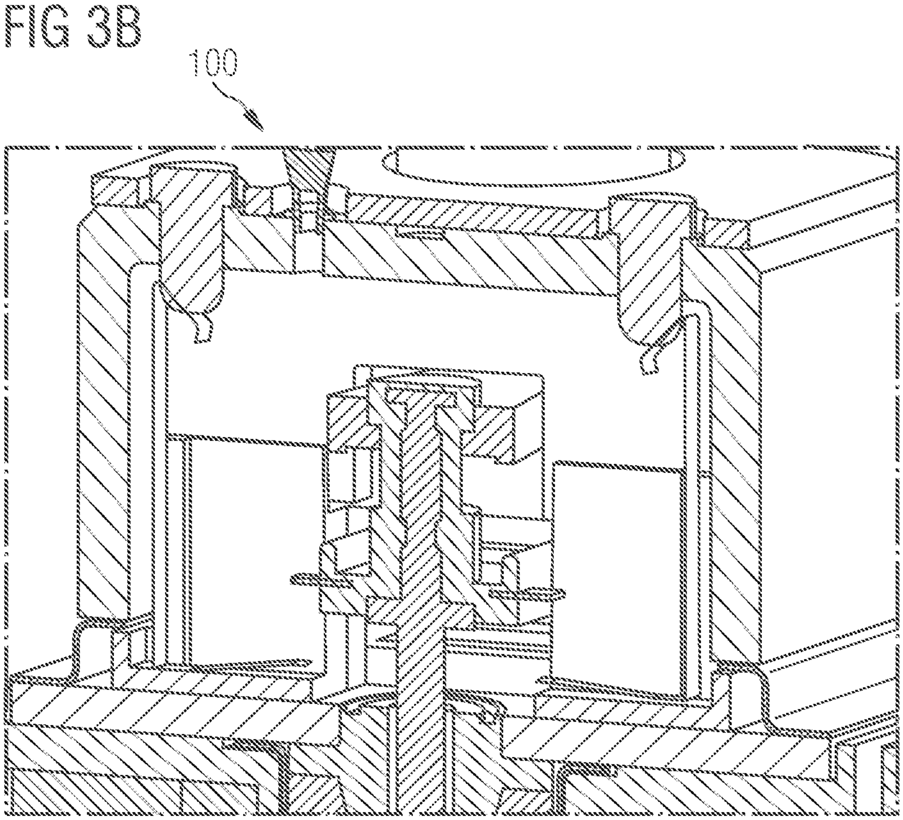

FIGS. 3A and 3B show sections of the switching device 100 corresponding to the view in FIG. 2A. In FIG. 3A, the switching device 100 is shown in the first switching state as in FIG. 2A, while in FIG. 3B, the switching device 100 is shown in the second switching state. The components and features of the switching device 100 shown in FIGS. 3A and 3B correspond to those described in connection with the previous figures. Therefore, for clarity, no further reference numerals are shown in FIGS. 3A and 3B.

In the first switching state, as described above, the movable contact is separated from the fixed contacts by the switching gap, so that the switching device 100 is in the non-connecting switching state while the contact plate is in electrical contact with the second contact regions of the spring contacts and thus also with the auxiliary contacts. As a result, the auxiliary contacts are electrically conductively connected to each other. In the second switching state, the movable contact and the contact plate are pushed upwards towards the fixed contacts by means of the armature. In particular, the movable contact is now galvanically connected to the fixed contacts so that the switching device is in the through-connecting switching state. The contact plate, on the other hand, is electrically separated from the spring contacts, so that the auxiliary contacts are also electrically separated from each other. For example, a resistance measurement of the electrical resistance between the auxiliary contacts thus allows detection of the switching state of the switching device.

The second contact regions of the spring contacts are designed in such a way that the contact plate loses a mechanical contact to the second contact regions of the spring contacts after covering a distance that is smaller than or equal to 20% of the switching gap during a transition of the switching device from the first to the second switching state. This makes it possible to achieve that the distance the armature has to travel on its way from the first to the second switching state before the contact between the contact plate and the spring contacts breaks off is very small. The second contact regions of the spring contacts are particularly preferably designed and bent upwards in such a way that, that, in the event of contact with the contact regions of the contact plate, they are pressed down by about 0.5 mm when the armature and thus also the contact plate are moved down to the lower mechanical stop of the armature, and accordingly lose contact with the contact plate after the corresponding distance when the armature and thus the contact plate are moved up.

In the event that the movable contact remains in the through-connecting state due to sticking or a mechanical defect, even though the mechanical drive has been switched off and the switching device should return to the first switching state, the contact plate remains at a distance from the second contact regions of the spring contacts so that the first switching state is not read off from the auxiliary contacts. This is possible even taking into account the overtravel, because although the armature with the contact plate drops down a certain distance towards the switching chamber base compared to the movable contact, the distance between the contact plate and the second contact regions of the spring contacts is still large enough to clearly not establish an electrically conductive connection between the auxiliary contacts. Mechanical interference by shocks follows the characteristics of the mechanical drive and the movable contact, that is, the electrical contact of the auxiliary contacts to each other would correctly indicate incomplete opening even after the movable contact is lifted from the fixed contacts by acceleration. The switching device described here thus provides reliable detection of the "safe open" condition, and combines this with a simple mechanism for detecting and carrying the signal out of a hermetically sealed switching chamber.

Another advantage is the very low-cost production, since no circuitry and no integrated circuits are required. Furthermore, no magnetic interference with the detection is possible. Furthermore, the detection of the switching states takes place far away from the main contacts, i.e. far away from the fixed contacts and the movable contact, so that no problems arise with regard to insulation or with regard to the risk of destruction by switching arcs.

The embodiment, based on the IEC 60947-5-1 standard, in this form also enables detection of the "switching device cannot close" state, i.e. the state that the moving system is blocked in the open position. Even if the upper part of the switching device is destroyed, it is still possible to detect whether the switching device has been set to the non-connecting state.

The features and embodiments described in connection with the figures can be combined with each other according to further embodiments, even if not all combinations are explicitly described. Furthermore, the embodiments described in connection with the figures may alternatively or additionally have further features according to the description in the general part.

The description based on the exemplary embodiments does not restrict the invention thereto. Instead, the invention comprises any novel feature and any combination of features, which, in particular, includes any combination of features in the claims, even if this feature or this combination itself is not explicitly specified in the claims or exemplary embodiments.

The invention claimed is:

1. A switching device comprising:

at least two fixed contacts and one movable contact in a switching chamber; and at least two auxiliary contacts, two spring contacts and a contact plate in the switching chamber, wherein each of the spring contacts contacts one of the auxiliary contacts with a first contact region and has a second contact region, wherein the contact plate is movable together with the movable contact along a vertical direction, wherein, for each of the spring contacts, the first contact region and the second contact region are arranged along the vertical direction with respect to each other, wherein the movable contact is located along the vertical direction between the first contact region and the second contact region for each of the spring contacts, and wherein the contact plate is configured to contact the second contact regions of the spring contacts in a first switching state of the switching device and is configured to be arranged at a distance from the second contact regions of the spring contacts in a second switching state.

2. The switching device according to claim 1, wherein the fixed contacts are arranged juxtaposed along a longitudinal direction and the auxiliary contacts are arranged juxtaposed along a transversal direction.

3. The switching device according to claim 1, further comprising a mechanical drive configured to move the movable contact and the contact plate, the mechanical drive comprising an armature with a shaft on which the movable contact and the contact plate are arranged.

4. The switching device according to claim 1, wherein the movable contact and the contact plate are arranged on an electrically insulating contact holder.

5. The switching device according to claim 4, wherein the contact plate is fixed to the contact holder.

6. The switching device according to claim 4, wherein the movable contact is slidably arranged on the contact holder.

7. The switching device according to claim 1, wherein the second contact regions are configured to exert a spring force on the contact plate in the first switching state.

8. The switching device according to claim 7, wherein a contact spring is arranged on a contact holder configured to exert a spring force on the movable contact in a direction towards the fixed contacts, and wherein the spring force of the second contact regions is less than the spring force of the contact spring.

9. The switching device according to claim 1, wherein the movable contact is separated from the fixed contacts by a switching gap in the first switching state or the second switching state, and wherein the contact plate is configured to lose a mechanical contact to the second contact regions of the spring contacts after covering a distance which is smaller than or equal to 20% of the switching gap during a transition of the switching device from the first to the second switching state.

10. The switching device according to claim 1, wherein each of the first contact regions of the spring contacts is configured to exert a spring force on one of the auxiliary contacts.

11. The switching device according to claim 1, wherein the switching chamber has a switching chamber wall with transversal sidewall parts opposing each other and with longitudinal sidewall parts opposing each other, and wherein each of the spring contacts has a connection region between the first and second contact regions that extends along a longitudinal sidewall part.

12. The switching device according to claim 1, wherein the auxiliary contacts, the spring contacts and the contact plate are arranged electrically insulated from the fixed contacts, the movable contact and a mechanical drive.

13. The switching device according to claim 1, wherein the switching chamber has a switching chamber wall with transversal sidewall parts opposing each other and with longitudinal sidewall parts opposing each other, and wherein the switching chamber has at least two webs which are arranged along a longitudinal direction between the at least two fixed contacts and each of which extends from at least one longitudinal sidewall part in a transversal direction into the switching chamber.

14. The switching device according to claim 13, wherein each of the webs extends in the transversal direction across the movable contact from one of the longitudinal sidewall parts to the other of the longitudinal sidewall parts, and wherein each of the webs includes a recess in which the movable contact can move during a switching operation.

15. The switching device according to claim 14, wherein the auxiliary contacts and the spring contacts are arranged in the longitudinal direction between the two webs.

16. The switching device according to claim 13, wherein the switching chamber has a switching chamber base with wall parts which are arranged between the webs and between which the spring contacts are arranged.

17. The switching device according to claim 1, wherein the auxiliary contacts and/or the spring contacts and/or the contact plate comprise a material comprising copper or a copper alloy.

18. The switching device of claim 17, wherein the material is selected from CuBe, $CuSn_4$, or $CuSn_6$.

19. The switching device according to claim 1, wherein the switching chamber is configured to contain a gas comprising $H_2$.

20. A switching device comprising:

at least one movable contact; and at least one auxiliary contact, at least one spring contact and a contact plate, wherein the at least one spring contact contacts the at least one auxiliary contact with a first contact region and has a second contact region that is arranged in a vertical direction with respect to the first contact region, wherein the contact plate is movable together with the movable contact along the vertical direction, wherein the movable contact is located along the vertical direction between the first contact region and the second contact region of the at least one spring contact, and wherein the contact plate is configured to contact the second contact region of the at least one spring contact in a first switching state of the switching device and is configured to be arranged at a distance from the second contact region of the at least one spring contact in a second switching state.

* * * * *